US012724968B2

(12) United States Patent
Fujisaki

(10) Patent No.: US 12,724,968 B2
(45) Date of Patent: Sep. 1, 2026

(54) INFORMATION PROCESSING APPARATUS, CONTROL METHOD OF INFORMATION PROCESSING APPARATUS, AND STORAGE MEDIUM

(71) Applicant: CANON KABUSHIKI KAISHA, Tokyo (JP)

(72) Inventor: Shimpei Fujisaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 139 days.

(21) Appl. No.: 18/521,035

(22) Filed: Nov. 28, 2023

(65) Prior Publication Data

US 2024/0193369 A1 Jun. 13, 2024

(30) Foreign Application Priority Data

Dec. 13, 2022 (JP) ................................ 2022-198643

(51) Int. Cl.
*G06F 40/295* (2020.01)
*G06F 16/16* (2019.01)
*G06F 40/284* (2020.01)

(52) U.S. Cl.
CPC .......... *G06F 40/295* (2020.01); *G06F 16/164* (2019.01); *G06F 40/284* (2020.01)

(58) Field of Classification Search
USPC ................................................ 704/7–10, 257
See application file for complete search history.

(56) References Cited

U.S. PATENT DOCUMENTS 11,366,966 B1 * 6/2022 Ramsey ................ G06F 40/295
11,828,616 B2 * 11/2023 Yoshikawa ....... G06F 16/90328
2010/0004925 A1 * 1/2010 Ah-Pine ................ G06F 16/355 704/9
2011/0022292 A1 * 1/2011 Shen .................. G10L 15/1815 704/E15.001
2012/0232904 A1 * 9/2012 Zhu ......................... G10L 15/22 704/E15.005
2014/0172754 A1 * 6/2014 He .......................... G06N 5/02 706/12
2018/0075013 A1 * 3/2018 Razack .................. G06N 5/022
2020/0035228 A1 * 1/2020 Seo ....................... G06F 40/295
2020/0327964 A1 * 10/2020 Zhang .................. G06F 40/295
2021/0089620 A1 * 3/2021 Finkelshtein ......... G06F 40/216
2021/0109954 A1 * 4/2021 Wang .................... G06F 40/295
2021/0157975 A1 * 5/2021 Gelosi ................... G06F 40/166
2022/0237237 A1 * 7/2022 Odobetskiy ............ G06Q 40/04
2023/0112369 A1 * 4/2023 Chopra .................. G06N 3/044 705/304

(Continued)

FOREIGN PATENT DOCUMENTS

JP 2013246795 A 12/2013

*Primary Examiner* — Leonard Saint-Cyr
(74) *Attorney, Agent, or Firm* — ROSSI, KIMMS & McDOWELL LLP

(57) ABSTRACT

The information processing apparatus includes: an extraction unit configured to extract a named entity by inputting document data to a named entity recognition model; and a display control unit configured to display a named entity extracted by the extraction unit on a UI screen, and in a case where a plurality of named entities extracted by the extraction unit is in a relationship between a generic concept and a specific concept, the display control unit displays the plurality of the named entities in one group.

8 Claims, 13 Drawing Sheets

(56) References Cited

U.S. PATENT DOCUMENTS

| | | | | |
|---|---|---|---|---|
| 2024/0193368 | A1* | 6/2024 | Kirch | G06F 40/40 |
| 2024/0193369 | A1* | 6/2024 | Fujisaki | G06F 16/164 |
| 2024/0242032 | A1* | 7/2024 | Bay | G06F 18/214 |

* cited by examiner

Estimate Form 2021.01.10

To DEF Inc.

1-2-3, chuo, chuo-ku, Tokyo
ABC Inc.
Personnel Department
First Personnel Division We are pleased to estimate as follows.
Estimated amount: ¥19,700

| Product Name | Quantity | Unit Price | Amount |
|---|---|---|---|
| AAA | 1 | ¥300 | ¥300 |
| … | … | … | … |
| … | … | … | … |
| Total amount | | ¥19,700 | |

Estimate expiration date: January 31

※Please contact ABC call center about the estimate form.

| TITLE | | Estimate Form |
|---|---|---|
| DATE | | 2021.01.10 |
| ORGto (Parent) | Gr1 | DEF Inc. |
| ORGfrom (Parent) | Gr1 | ABC Inc. |
| ORGfrom (Child) | Gr1 | Personnel Department |
| ORGfrom (Child) | Gr1 | First Personnel Division |

FIG.7A

Application

We apply … as follow.

Personnel Department
First Personnel Division
Development Department
First Development Room

| TITLE | | Application |
|---|---|---|
| ORGfrom (Parent) | Gr1 | Personnel Department |
| ORGfrom (Child) | Gr1 | First Personnel Division |
| ORGfrom (Parent) | Gr2 | Development Department |
| ORGfrom (Child) | Gr2 | First Development Room |

FIG.7B

Estimate Form
2021.01.10
To DEF Inc.
1-2-3, chuo, chuo-ku, Tokyo
ABC Inc.
Personnel Department
First Personnel Division
We are pleased to estimate as follows.
Estimated amount: ¥19,700

| Product Name | Quantity | Unit Price | Amount |
|---|---|---|---|
| AAA | 1 | ¥300 | ¥300 |
| ... | ... | ... | ... |
| ... | ... | ... | ... |
| | Total amount | ¥19,700 | |

Estimate expiration date: January 31
※Please contact ABC call center about the estimate form.

FIG.10A

■Individual Modification Contents of Modification Information 233

Document Type: Estimate Form
Named Entity Typ: ORGfrom
Output permission / prohibition:
Parent type:
Text: ABC Inc.:
Output permission / prohibition: Output
Child type:
{
Text: Business Department
Output permission / prohibition: Output
},
{
Text: Third Business Division
Output permission / prohibition: Not output
}

FIG.10B

| Named Entity Type | Group | Named Entity Text | Output Permission / Prohibition before Modification | Output Permission / Prohibition after Modification |
|---|---|---|---|---|
| TITLE | | Estimate Form | Output | Output |
| DATE | | 2021.01.10 | Output | Output |
| ORGto (Parent) | Gr1 | DEF Inc. | Output | Output |
| ORGfrom (Parent) | Gr1 | ABC Inc. | Output | Output |
| ORGfrom (Child) | Gr1 | Personnel Department | Not output | Output |
| ORGfrom (Child) | Gr1 | First Personnel Division | Not output | Not output |

FIG.10C 1100
1110
1120
Application
We apply ··· as follow.
Personnel Department
First Personnel Division
Development Department
First Development Room
1125a
1125b
TITLE
Application
1125
1126a
1126b
ORGfrom 1
Personnel Department
First Personnel Division
1126c
1126
1127a
1127b
ORGfrom 2
Development Department
First Development Room
1127c
1127

INFORMATION PROCESSING APPARATUS, CONTROL METHOD OF INFORMATION PROCESSING APPARATUS, AND STORAGE MEDIUM

BACKGROUND OF THE INVENTION

Field of the Invention

The present disclosure relates to extraction of a named entity having a hierarchical structure.

Description of the Related Art

There is a technique to automatically assign an appropriate file name by scanning characters within a document image and converting the read characters into an electronic file. Elements configuring a file name to be assigned automatically include an organization name, person name, document number, date of document issuance and the like within a document, in addition to a date of file creation and the like, and it is possible to extract those elements by a named entity recognition technique, which is an applied technique in the natural language processing field.

Among elements to be extracted, there is an element having a hierarchical structure, such as an organization name. In a case of an element having a hierarchical structure, the extraction-target hierarchical layer differs in accordance with the situation of the use by a user. Consequently, Japanese Patent Laid-Open No. 2013-246795 (hereinafter, referred to as Document 1) has disclosed a method described below. That is, in a case where a named entity has a hierarchical structure and detailed category classification is performed, a detailed type is determined for hierarchical layers including the lowermost hierarchical layer at the time of performing named entity recognition by using a plurality of characteristic amount extraction units and a plurality of named entity recognition units. Thereby, it is possible to select to extract named entities in the whole hierarchy or extract a named entity in a specific hierarchical layer in accordance with an input from a user.

With the technique according to Document 1, named entities having a plurality of hierarchical layers are not grouped. In order to display a named entity having a plurality of hierarchical layers on a UI screen, the user sets in detail from which hierarchical layer a named entity is extracted each time of processing.

SUMMARY OF THE INVENTION

The information processing apparatus according to the present invention includes: an extraction unit configured to extract a named entity by inputting document data to a named entity recognition model; and a display control unit configured to display a named entity extracted by the extraction unit on a UI screen, and in a case where a plurality of named entities extracted by the extraction unit is in a relationship between a generic concept and a specific concept, the display control unit displays the plurality of the named entities in one group.

Further features of the present invention will become apparent from the following description of exemplary embodiments with reference to the attached drawings.

BRIEF DESCRIPTION OF THE DRAWINGS

FIG. 7A is a schematic diagram showing a specific example of results of named entity grouping by the grouping unit;

FIG. 7B is a schematic diagram showing a specific example of results of named entity grouping by the grouping unit;

FIG. 10A is a schematic diagram showing a specific example of results of the output permission/prohibition determination processing performed by the initial output determination unit;

FIG. 10B is a schematic diagram showing a specific example of results of the output permission/prohibition determination processing performed by the initial output determination unit;

FIG. 10C is a schematic diagram showing a specific example of results of the output permission/prohibition determination processing performed by the initial output determination unit;

DESCRIPTION OF THE EMBODIMENTS

Figure 1:
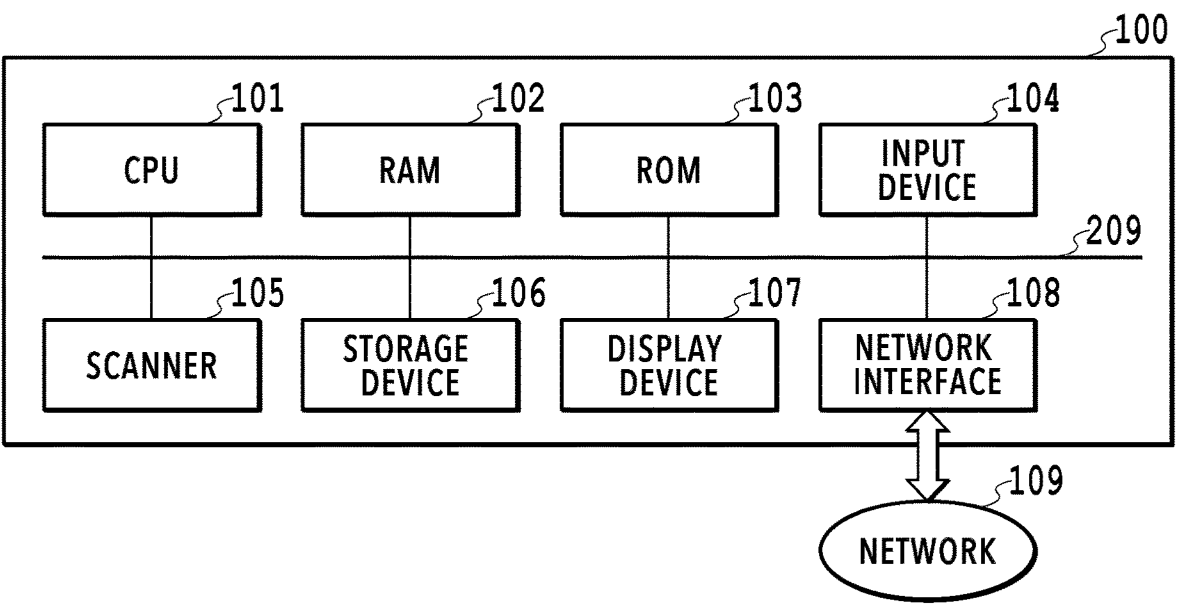
FIG. 1 is a block diagram showing a hardware configuration of an information processing apparatus.

Hereinafter, with reference to the attached drawings, the present invention is explained in detail in accordance with preferred embodiments. Configurations shown in the following embodiments are merely exemplary and the present invention is not limited to the configurations shown schematically. In addition, the same components are denoted by the same reference numerals. Further, each process (step) in the flowcharts and the sequence charts is denoted by a reference numeral starting with S.

First Embodiment

An information processing apparatus 100 performs processing to extract characters in a desired portion from document image data and automatically transcribe the extracted characters as a file name appropriate for the document image data. The operation of the information processing apparatus 100 according to a first embodiment is explained in detail by using FIG. 1 to FIG. 4.

<Hardware Configuration of Information Processing Apparatus>

FIG. 1 is a block diagram showing a hardware configuration of the information processing apparatus 100 according to the first embodiment. With reference to FIG. 1, the hardware configuration of the information processing apparatus 100 is explained.

The hardware of the information processing apparatus 100 includes a CPU 101, a RAM 102, a ROM 102, an input device 104, a scanner 105, a storage device 106, a display device 107, and a network interface 108.

The CPU 101 controls the information processing apparatus 100 by reading control programs and data stored in the ROM 103 onto the RAM 102 and performing various type of processing, to be described later.

The RAM 102 is used as a temporary storage area, such as a main memory and a work area, of the CPU 101.

The ROM 103 stores fixed data, such as control programs and data, executed by the CPU 101.

The input device 104 receives the input operation from a user.

The scanner 105 generates document data by reading a paper document.

The storage device 106 is a large-capacity storage device storing document data and the like.

The display device 107 displays various types of information and includes, for example, a touch panel. In the present embodiment, the input device 104 and the display device 107 are provided as separated devices, but it may also be possible to integrate both devices as a display input device. As an example of the display input device, there is an operation panel or the like.

The network interface 108 is an interface connecting the information processing apparatus 100 to a network 109.

In the above, explanation is given on the assumption that the information processing apparatus 100 is one apparatus, but it may also be possible to configure the information processing apparatus 100 from a plurality of apparatuses. For example, the storage device 106 may use an external storage server.

<Function Configuration of Information Processing Apparatus>

Figure 2:
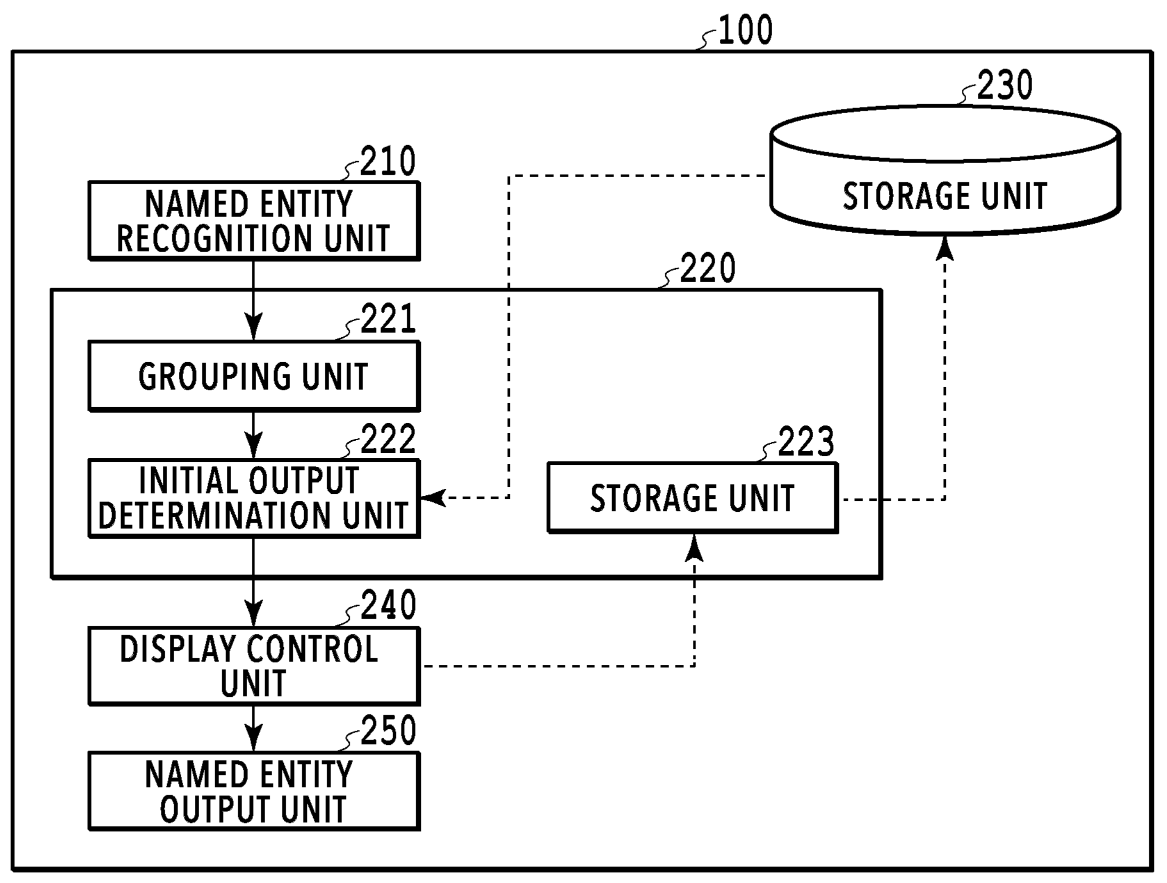
FIG. 2 is a block diagram showing an essential portion of a function configuration of the information processing apparatus.

FIG. 2 is a block diagram showing an essential portion of the function configuration of the information processing apparatus 100 according to the first embodiment.

Figure 3:
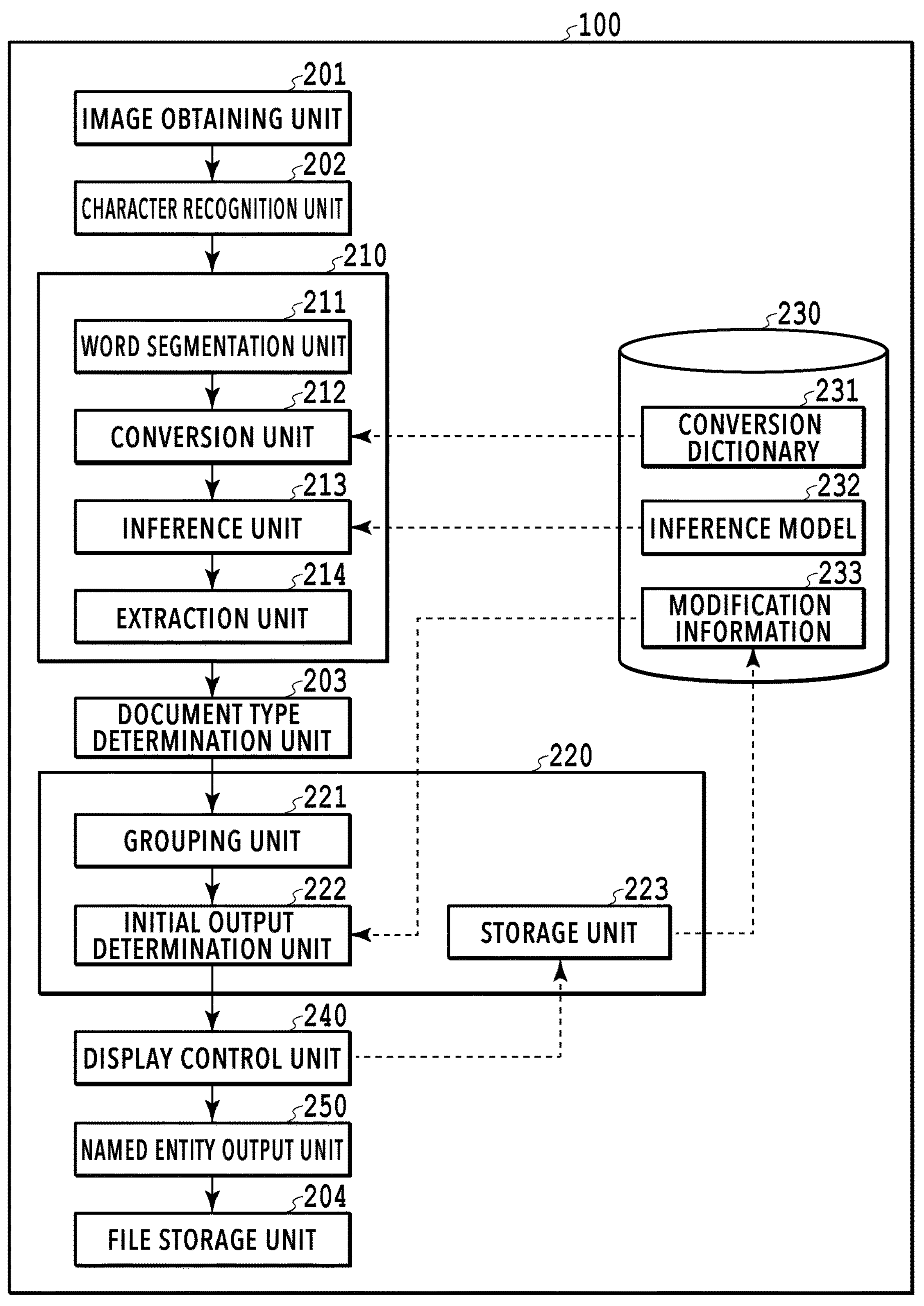
FIG. 3 is a block showing the whole of the function configuration of the information processing apparatus.

FIG. 3 is a block diagram showing the whole of the function configuration of the information processing apparatus 100 according to the first embodiment. With reference to FIG. 2 and FIG. 3, the function configuration of the information processing apparatus 100 is explained.

The function configuration of the information processing apparatus 100 includes an image obtaining unit 201, a character recognition unit 202, a named entity recognition unit 210, a document type determination unit 203, an initial output setting unit 220, a storage unit 230, a display control unit 240, a named entity output unit 250, and a file storage unit 204.

Each function of the information processing apparatus 100 is implemented by the CPU 101 performing processing based on control programs and various types of data stored in the ROM 103, which are read onto the RAM 102.

The storage unit 230 is implemented by the RAM 102 and the storage device 106 and stores data, such as a conversion dictionary 231, an inference model 232, and modification information 233.

In the following, in accordance with the order of description in FIG. 3, each function configuration is explained.

The image obtaining unit 201 obtains document image data for which various types of processing is performed by a user operating the input device 104 included in the information processing apparatus 100. The obtaining of the document image data is performed by utilizing the scanner 105 for a paper document (document). However, this is not limited and it may also be possible to use image data stored in the storage device 106, such as an HDD, as document image data, or it may also be possible to use image data stored in a storage device arranged on the network 109 via the network interface 108 as document image data.

The character recognition unit 202 detects a character string area existing in the document image data and obtains a character string described in the character string area. Further, the character recognition unit 202 obtains one character string coupling each character string in an input image as an input character string based on coordinates of the character string area. Then, the character recognition unit 202 creates document data D including information, such as positional information on the input character string and each character string, positional information on a ruled line, and information on the size and the like of the document image and stores the document data D in the storage device 106.

The named entity recognition unit 210 performs the named entity recognition processing based on the document data D. The named entity recognition unit 210 includes a word segmentation unit 211, a conversion unit 212, an inference unit 213, and an extraction unit 214.

The word segmentation unit 211 generates an input token string by performing word segmentation into each token for the input character string within the document data D.

The conversion unit 212 obtains the conversion dictionary 231 stored in the storage unit 230 and performs conversion processing.

The inference unit 213 loads the inference model 232 stored in the storage unit 230.

The extraction unit 214 generates named entity recognition results by assigning the named entity type having the highest probability to each token and obtaining the character string of each named entity type.

The document type determination unit 203 performs document type determination.

The initial output setting unit 220 includes a grouping unit 221, an initial output determination unit 222, and a storage unit 223.

The grouping unit 221 performs grouping for the named entity extracted by the named entity recognition processing.

The initial output determination unit 222 performs output permission/prohibition determination. In the output permission/prohibition determination, the initial output determination unit 222 determines information about whether or not which named entity is output, that is, whether or not to use for assignment of a document image file name. The information is used as the contents of the initial display of the display device 107.

In a case where the display control unit 240, to be described later, receives a request to modify output permission/prohibition information (display permission/prohibition information) from a user, the storage unit 223 stores the contents of the modification request in the storage unit 230 as the modification information 233.

In the modification information 233, information on the type of each named entity included in the modified named entity group and text of each named entity, output permission/prohibition change contents before and after modification, or the type of the document in which the modified named entity is included, and the like is included.

The display control unit 240 displays the named entity recognition results on the display device 107, such as a touch panel.

The named entity output unit 250 outputs the named entity recognition results and document type determination results to the file storage unit 204, to be described later.

The file storage unit 204 assigns a file name to the document image data obtained by the image obtaining unit 201 based on the output results of the named entity output unit 250 and stores the document image data under a predetermined folder.

<Flow of Whole Processing>

Figure 4:
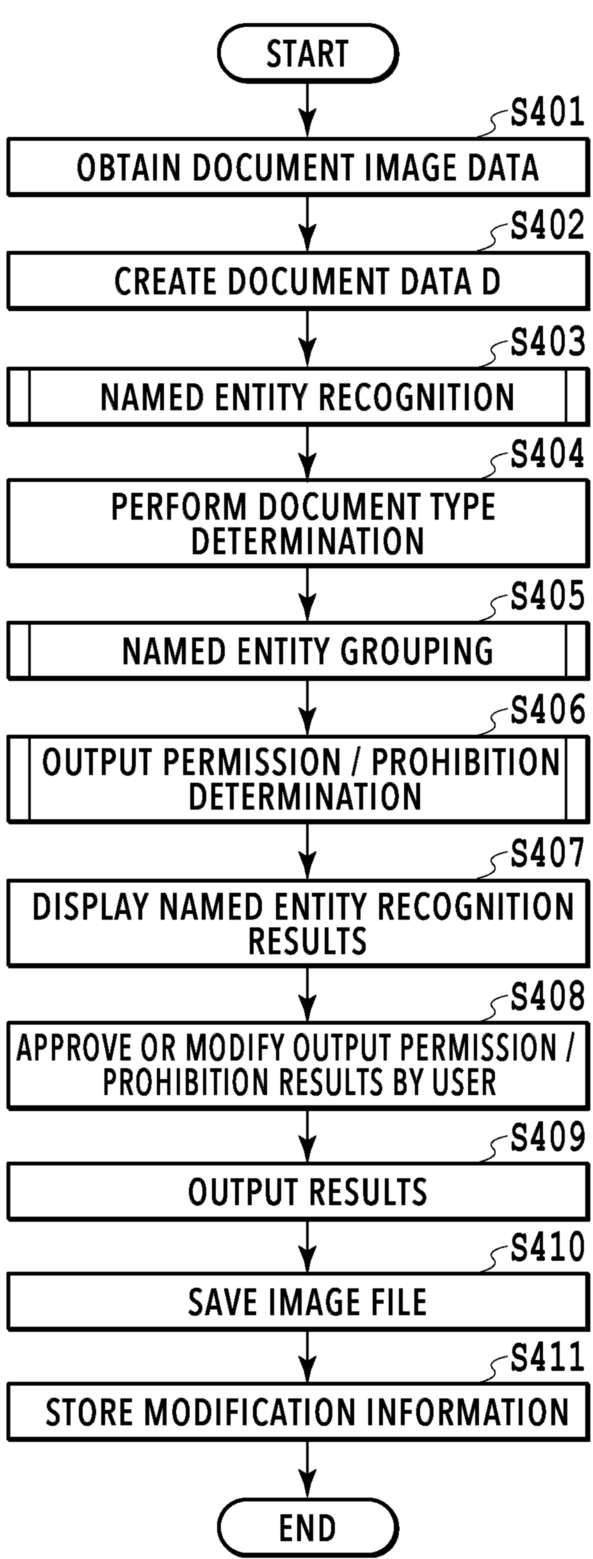
FIG. 4 is a flowchart showing a flow of whole processing.

FIG. 4 is a flowchart showing a flow of the whole processing in the first embodiment.

At S401, the image obtaining unit 201 obtains document image data for which a variety of pieces of processing is performed by the user operating the input device 104 included in the information processing apparatus 100. In a case where obtaining the document image data is completed, the processing advances to S402.

At S402, the character recognition unit 202 detects a character string area existing in the document image data by performing character recognition processing for the document image data and obtains the character string described in the character string area. Further, the character recognition unit 202 obtains one character string coupling each character string in the input image as an input character string based on the coordinates of the character string area. Then, the character recognition unit 202 creates the document data D including positional information on the input character string and each character string, the positional information on the ruled line, and information on the size and the like of the document image and stores the document data D in the storage device 106. In a case where the processing is completed, the processing advances to S403.

At S403, the named entity recognition unit 210 extracts the named entity of the document data D by inputting the document data D to the named entity recognition model. Details of the named entity recognition processing will be described later. In a case where the named entity recognition processing is completed, the processing advances to S404.

At S404, the document type determination unit 203 performs processing-target document type determination. Specifically, the document type determination unit 203 performs the following processing. The document type determination unit 203 obtains named entity text of the "TITLE" type of named entity recognition results, and then, determines whether a reserved word representing each document type is included inside the obtained text, and in a case where the reserved word is included, sets the document type associated with the reserved word as the document type of the document. For example, in a case where the text of the named entity of "TITLE" is "Estimate", "Estimate" that is the reserved word of the document type "Estimate Form" is included inside the text, and therefore, it is possible to determine that this document type is the estimate form.

The document type determination method is not limited to this and another method may be used. For example, it may also be possible to separately prepare an inference model for document type determination, input the input token string obtained by performing word segmentation into each token for the input character string within the document data D, and obtain document type determination results as output results. Further, it may also be possible to enable obtaining of document type determination results by making it possible to perform inference of a multitask including not only named entity recognition but also document type determination by using the inference model 232. In a case where the processing of the document type determination is completed, the processing advances to S405.

At S405, the grouping unit 221 performs grouping for the named entity extracted by the named entity recognition processing at S403. Details of processing of the named entity grouping will be described later. In a case where the processing of the named entity grouping is completed, the processing advances to S406.

At S406, the initial output determination unit 222 performs processing of output permission/prohibition determination. Details of the processing of the output permission/prohibition determination will be described later. In a case where the processing of the output permission/prohibition determination is completed, the processing advances to S407.

At S407, the display control unit 240 displays the named entity recognition results on the display device 107, such as a touch panel. In a case where the named entity recognition results are displayed on the display device 107, the processing advances to S408.

At S408, the display control unit 240 requests the user to approve or modify output permission/prohibition determination results for each extracted named entity. That is, the user approves or modifies the output permission/prohibition information on each named entity. In a case where the processing is completed, the processing advances to S409.

At S409, the named entity output unit 250 outputs the named entity recognition results and the document type determination results to the file storage unit 204. Here, the named entity output unit 250 outputs them in a dictionary format in which the text corresponding to each named entity type is taken as a key and a value. At this time, in a case where there is a plurality of named entities within the same group, whose output is determined to be possible, the text of the plurality of named entities whose output is possible is coupled and output as one named entity. In a case where the results are output to the file storage unit 204, the processing advances to S410.

At S410, the file storage unit 204 assigns a file name to the document image data obtained by the image obtaining unit 201 based on the output results of the named entity output unit 250 and stores the document image data under a predetermined folder. The document image data is converted into the pdf format and stored within the storage device 106 or within an external server via the network 109. In a case where the storage of the file is completed, the processing advances to S411.

At S411, in a case where the display control unit 240 receives a request to modify output permission/prohibition information from the user, the storage unit 223 stores the modification information 233 in the storage device 106 based on the contents of the modification request. In a case where the storage of the modification information in the storage device 106 is completed, the processing of the flowchart shown in FIG. 4 is finished.

<Named Entity Recognition Processing>

Figure 5:
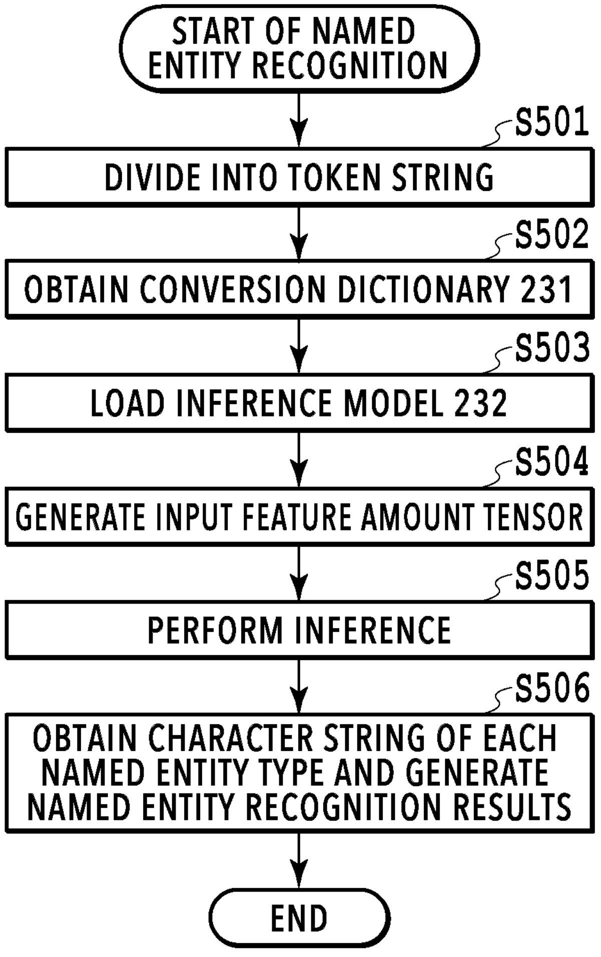
FIG. 5 is a flowchart showing named entity recognition processing performed by a named entity recognition unit.

FIG. 5 is a flowchart showing a flow of the named entity recognition processing.

At S501, the word segmentation unit 211 generates an input token string by performing word segmentation into each token for the input character string within the document data D. For example, the word segmentation unit 211 performs word segmentation for a character string "Date of issue: Jun. 11, 2017" into eight tokens, that is, "/Date/of/issue/:/June/11/,/2017/". In a case where the input token string is generated, the processing advances to S502.

At S502, the conversion unit 212 obtains the conversion dictionary 231 stored in the storage unit 230 and the processing advances to S503.

At S503, the inference unit 213 loads the inference model 232 stored in the storage unit 230. Here, the inference model 232 is a parameter set representing a machine learning model implementing the inference unit 213. In a case where the machine learning model has a neural network structure, such as Transformer, the inference model 232 has a network configuration, a weight between networks, and various parameters. In a case where the load of the inference model 232 is completed, the processing advances to S504.

At S504, the conversion unit 212 maps each token of the input token string to a characteristic amount space by using the conversion dictionary 231 and generates an input characteristic amount tensor. In a case where the input characteristic amount tensor is generated, the processing advances to S505.

At S505, the inference unit 213 inputs the input characteristic amount tensor to the inference model 232 and outputs a set of probabilities of each token becoming each named entity type and the processing advances to S506.

At S506, the extraction unit 214 generates named entity recognition results by assigning the named entity type whose probability is the highest to each token and obtaining the character string of each named entity type. More specifically, the processing as follows is performed.

First, as the type, the IOB2 format that is used generally in the field of the named entity recognition technique is used. In the IOB2 format, to the first token of a character string meaning a named entity, B-<any character string> type is assigned, to the second and subsequent tokens, I-<any character string> type is assigned, and to a token not corresponding to any named entity, O type is assigned. Then, the area from the B type to the continuous I types of the same type is taken as the character string of the same type. For example, it is assumed that for the token string "/Date/of/issue/:/June/11/,/2017/", B-Date type is inferred for the token "June", and following this, I-Date type is inferred continuously up to the last token "2017". In this case, as the named entity type "Date", a character string "Jun. 11, 2017" is obtained.

As the named entity type extracted by the named entity recognition processing, for example, there are "TITLE" representing a title, "ID" representing a number, "PERSON" representing a person, "ORGfrom" representing an issuing organization, and "ORGto" representing a destination organization, in addition to the above-described "Date".

In a case where the named entity recognition results are generated, the flow of the named entity recognition processing shown in FIG. 5 is finished.

<Named Entity Grouping Processing>

Figure 6:
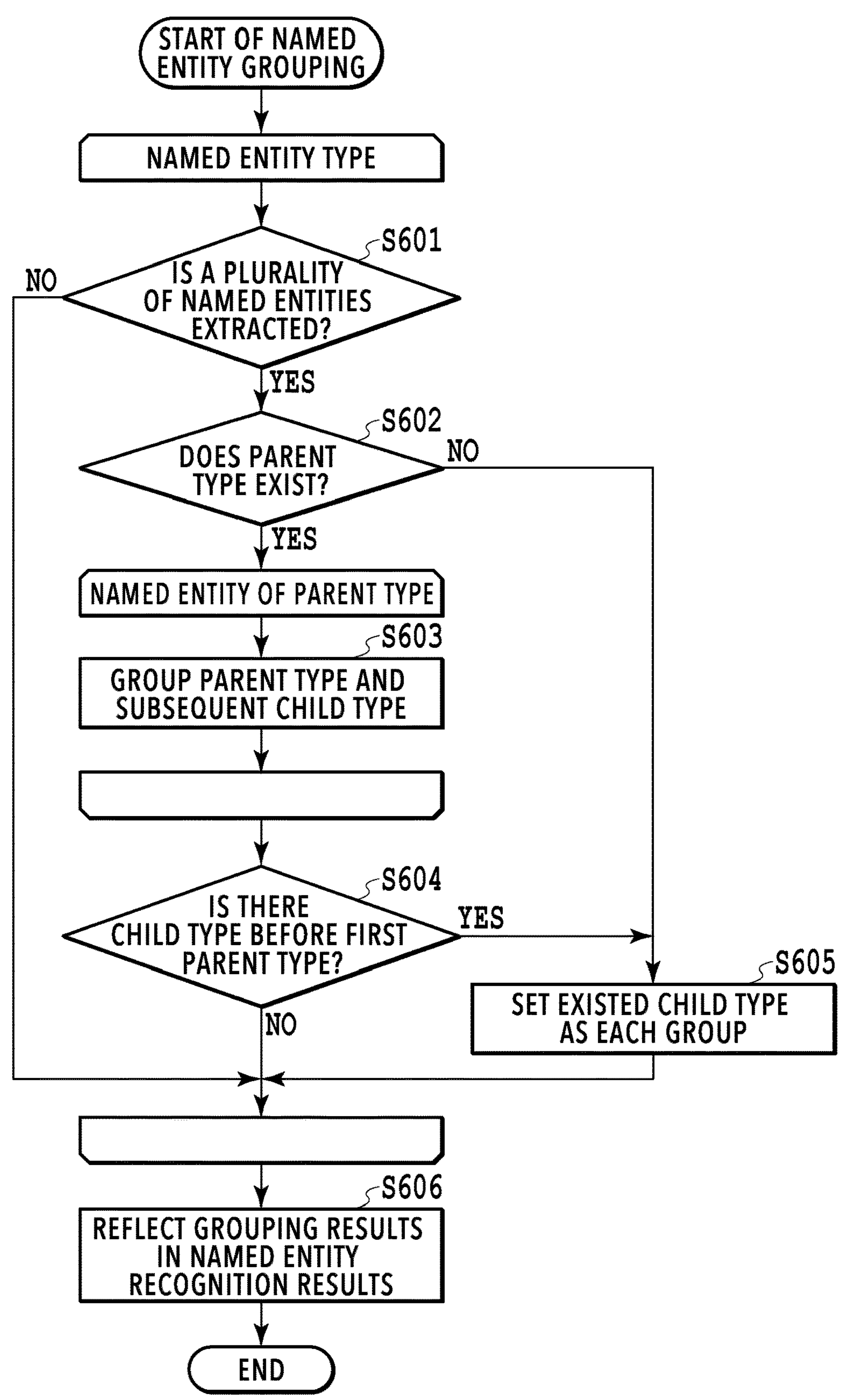
FIG. 6 is a flowchart showing named entity grouping processing performed by a grouping unit.

FIG. 6 is a flowchart showing a flow of the named entity grouping processing that is performed by the grouping unit 221.

Among the named entity types, the named entity representing an organization, such as "ORGfrom" and "ORGto", has a hierarchical structure. The grouping unit 221 performs grouping for the named entity having the hierarchical structure such as this. For example, in a case where "ABC Inc.", "Personnel Department", and "First Personnel Division" are each extracted as the named entity of an organization from a character string "ABC Inc. Personnel Department First Personnel Division", each named entity is in a hierarchical relationship and related to one another, and therefore, they are grouped in advance. By performing grouping, this allows the user to efficiently select or modify which hierarchical layer of the named entity to use. Details thereof will be described later.

Here, in the inference model 232 of the present embodiment, "ORGfrom" and "ORGto" are further divided into a parent type (parent level) and a child type (child level) and extracted. For example, the parent type of "ORGfrom" is taken to be "ORGfromParent" and the child type is taken to be "ORGfromChild" and the patent type of "ORGto" is taken to be "ORGtoParent" and the child type is taken to be "ORGtoChild". The parent type represents the top hierarchical layer in the hierarchical structure and the child type represents a hierarchical layer lower than the top hierarchical layer. For example, for the character string "ABC Inc Personnel Department First Personnel Division" described previously, "ABC Inc." is extracted as the parent type and "Personnel Department" and "First Personnel Division" are each extracted as the child type.

The grouping unit 221 performs the named entity grouping processing for each relevant named entity type In the present embodiment, the relevant named entity type is "ORGfrom" and "ORGto".

At S601, whether or not a plurality of the named entities described above is extracted is determined. That is, whether or not a named entity having a hierarchical structure is extracted is determined.

In a case where a plurality of named entities is not extracted, the processing returns again to S601 in order to perform processing of the next named entity type. However, in a case where the processing of all the named entity types is completed, the processing advances to S606.

In a case where a plurality of named entities is extracted, the processing advances to S602.

At S602, whether or not a parent type exists in the extracted named entity is determined. In a case where a parent type exists, the processing advances to S603. In a case where a parent type does not exist, the processing advances to S605.

At S603, for one named entity of parent type, one group is generated. Specifically, a named entity of child type after a certain named entity of parent type in the order of the input character string of the document data D is included in the same group of the named entity of parent type. At this time, in a case where another named entity of the same parent type exits after the named entity of parent type, the named entity of child type existing between the named entity of parent type and the other named entity of the same parent type is included in the same group. In a case where no child type exists after the named entity of parent type, the group includes only the parent type. In a case where the above-described processing is completed, the processing advances to S604.

At S604, whether or not a named entity of child type exists before the first named entity of parent type is determined. In a case where a named entity of child type exists before the first named entity of parent type, the processing advances to S605. In a case where no named entity of child type exists before the first named entity of parent type and the processing is not completed for all the named entity types, the processing returns to S601. In a case where no named entity of child type exists before the first named entity of parent type and the processing is completed for all the relevant named entity types is completed, the processing advances to S606.

At S605, each named entity of child type existing before the first named entity of parent type is set as a group having a single element. In a case where the setting of group is completed and the processing is not completed for all the named entity types, the processing returns to S601. In a case where the setting of group is completed and the processing is completed for all the named entity types, the processing advances to S606.

At S606, the grouping unit 221 reflects the results of the grouping described above in the named entity recognition results. In a case where the results of grouping are reflected in the named entity recognition results, the flow of the flowchart shown in FIG. 6 is finished.

FIG. 7A and FIG. 7B show two specific examples of the results of the named entity grouping processing described above. FIG. 7A and FIG. 7B show document image data and the corresponding named entity recognition results after the named entity grouping processing.

In FIG. 7A, as "ORGfromParent", "ABC Inc." is extracted and as "ORGfromChild", "Personnel Department" and "First Personnel Division" are extracted and put together into one group.

In FIG. 7B, as "ORGfromParent", "Personnel Department" and "Development Department" are extracted and as "ORGfromChild", "First Personnel Division" and "First Development Room" are extracted. Then, two groups, that is, "Personnel Department First Personnel Division" and "Development Department First Development Room" are generated.

As described above, the inference unit 213 of the present embodiment does not perform inference so that the specific classification such as "Department" is always the parent type or the child type. In a case where the specific classification is supposed to be the uppermost hierarchical layer of the group and is the named entity representing the generic concept (generic concept level), the specific classification is determined to be the parent type. In a case where the specific classification is supposed to be a lower hierarchical layer and is the named entity representing the specific concept (specific concept level), the specific classification is determined to be the child type.

As the grouping method, the method is described in which the child type after one certain parent type is included in the same group of the parent type, but the method is not limited to this. For example, a method may also be acceptable in which in a case where the difference in position coordinates within a document between the parent type and the child type is within a threshold value, the parent type and the child type are put together into the same group.

Further, in the method described above, the method is proposed in which the type is extracted by dividing the type into the parent type and the child type, but the method is not limited to this. For example, it may also be possible to set a grandchild type and a type lower than the grandchild type as the hierarchical layer lower than the child type. Further, in accordance with the kind of organization, it may also be possible to change the type to be labeled in the inference model 232. In this case, for example, for "Personnel Department", "ORGdepart" type representing the department is set and labeled, and for "First Personnel Division", "ORGdiv" type representing the division is set and labeled.

<Output Permission/Prohibition Determination Processing>

Figure 8:
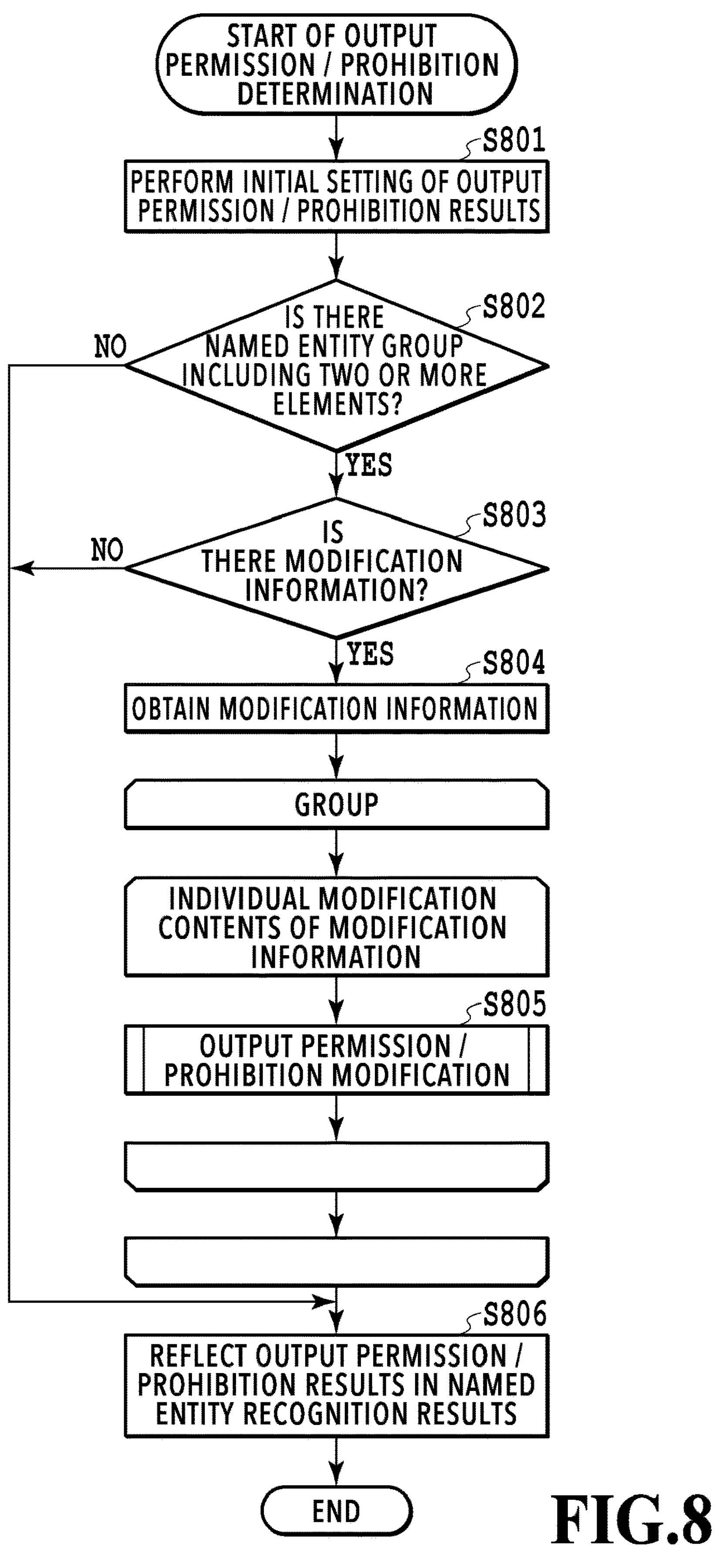
FIG. 8 is a flowchart showing output permission/prohibition determination processing performed by an initial output determination unit.

FIG. 8 is a flowchart showing the output permission/prohibition processing according to the present embodiment.

In the output permission/prohibition determination, information on whether or not which named entity is output, that is, whether or not to use for assignment of a document image file name is determined and used as the contents of an initial display by the display control unit 240.

At S801, the initial output determination unit 222 performs the initial setting of the output permission/prohibition results so that the child type is not output and the other types other than child type (that is, the parent type and the named entity type not having a hierarchical structure) are output. The reason the initial setting is performed here so that the parent type is output but the child type is not output is that there are many cases where only the parent type of an organization is necessary in assigning a file name. In a case where the initial setting of the output permission/prohibition results is completed, the processing advances to S802.

At S802, the initial output determination unit 222 determines whether or not a named entity group including two or more elements exists within the named entity recognition results. In a case where a named entity group including two or more elements exists, the processing advances to S803. In a case where a named entity group including two or more elements does not exist, the processing advances to S806.

At S803, the initial output determination unit 222 determines whether or not the modification information 233 exists.

In a case where the modification information 233 exists, the processing advances to S804. In a case where the modification information 233 does not exist, the processing advances to S806.

At S804, the initial output determination unit 222 obtains the modification information 233 stored in the storage device 106. The modification information 233 includes the contents of the output permission/prohibition information on the named entity, which is modified by a user in the past at S408 described above via the display control unit 240. In the modification information 233, information on the type of each named entity included in the modified named entity group and text of each named entity, the output permission/prohibition change contents before and after modification, the type of the document in which the modified named entity is included, or the like, is included. In a case where the initial output determination unit 222 obtains the modification information 233, the processing advances to S805.

At S805, the initial output determination unit 222 performs output permission/prohibition modification processing for each named entity group including two or more elements for each of the individual modification contents included in the modification information 233. In a case where the output permission/prohibition modification processing is completed for all the relevant named entity groups, the processing advances to S806. Details of the output permission/prohibition modification processing will be described later.

At S806, the initial output determination unit 222 reflects the modified output permission/prohibition information in the named entity recognition results. In a case where the modified output permission/prohibition information does not exist, the processing is not performed particularly. In a case where the processing at S806 is completed, the flow of the output permission/prohibition determination processing shown in FIG. 8 is finished.

<Output Permission/Prohibition Modification Processing>

Figure 9:
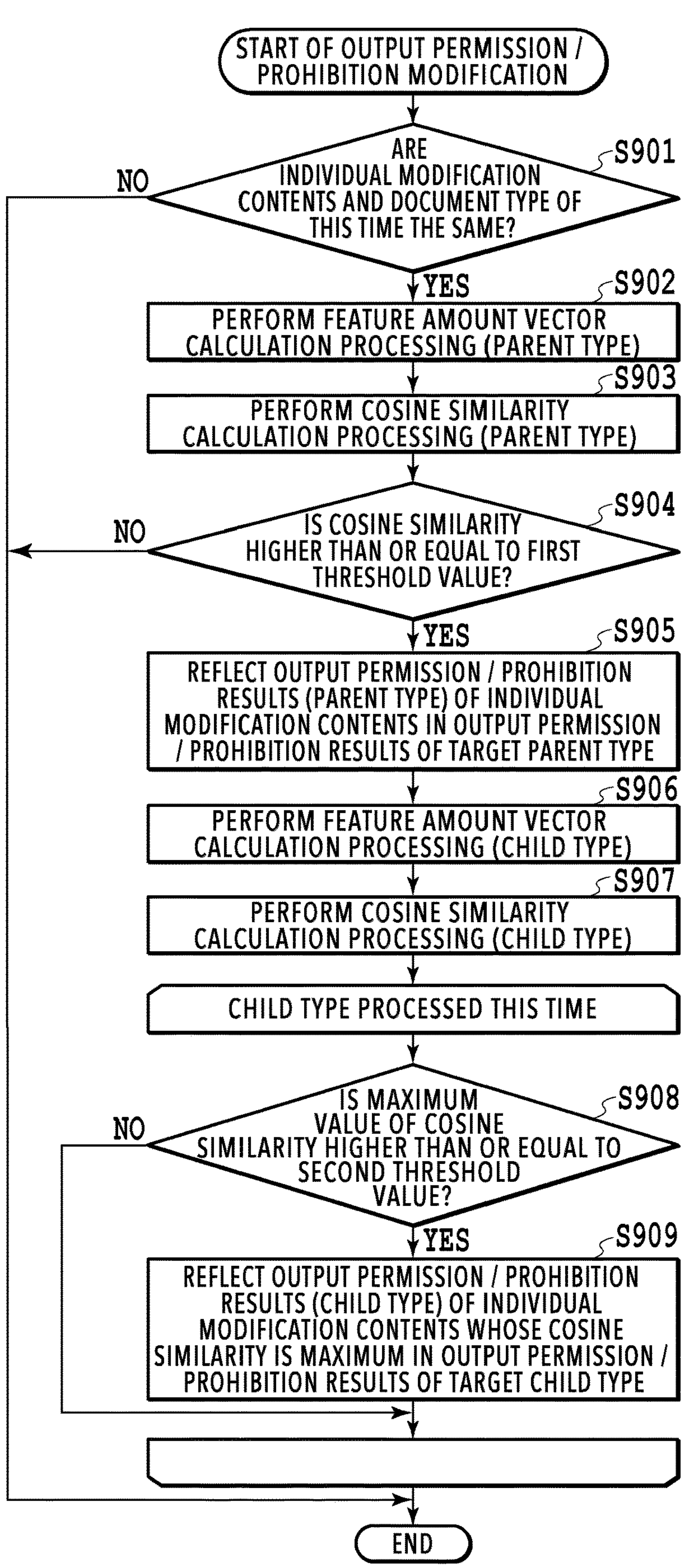
FIG. 9 is a flowchart showing output modification processing performed by the initial output determination unit.

FIG. 9 is a flowchart showing the output permission/prohibition modification processing according to the present embodiment.

At S901, the initial output determination unit 222 determines whether or not individual modification contents and the document type of the document of this time are the same. In a case where the individual modification contents and the document type of the document of this time are the same, the processing advances to S902. In a case where the individual modification contents and the document type of the document of this time are not the same, the flow of the output permission/prohibition modification processing shown in FIG. 9 is finished.

At S902, the initial output determination unit 222 calculates a characteristic amount vector of the individual modification contents of the modification information 233 and a characteristic amount vector of each parent type text of the named entity group processed this time. Specifically, the processing described below is performed. First, by using the word segmentation unit 211, the relevant text is divided into each token. Then, the conversion unit 212 converts each token into a characteristic amount vector by using the conversion dictionary 231. Further, the obtained characteristic amount vectors of each token are averaged and the results are taken as the characteristic amount vector of the whole text. In a case where all the characteristic amount vectors are calculated, the processing advances to S903.

At S903, the cosine similarity between the calculated characteristic amount vector of the individual modification contents and the calculated characteristic amount vector of each parent type text processed this time is calculated. In a case where the cosine similarity is calculated, the processing advances to S904.

At S904, the initial output determination unit 222 determines whether or not the calculated cosine similarity is higher than or equal to a first threshold value. In a case where the calculated cosine similarity is higher than or equal to the first threshold value, the processing advances to S905. In a case where the calculated cosine similarity is less than the first threshold value, the flow of the output permission/prohibition modification processing shown in FIG. 9 is terminated. Here, the first threshold value is set to an appropriate value in accordance with the situation.

At S905, the initial output determination unit 222 reflects the output permission/prohibition results of the parent type of the individual modification contents in the output permission/prohibition results of the parent type processed this time. In a case where the processing described at S905 is completed, the processing advances to S906.

At S906, the initial output determination unit 222 calculates a characteristic amount vector of the individual modification contents and a characteristic amount vector of each child type text of the named entity group processed this time. The characteristic amount vector calculation method is the same as the calculation method at S902. In a case where the processing described at S906 is completed, the processing advances to S907.

At S907, the cosine similarity between the calculated characteristic amount vector of the individual modification contents and the calculated characteristic amount vector of each child type text processed this time is calculated for all the combinations. As a specific example, a case where "child type" of "individual modification contents" is "Business Department" and "Third Business Division" and "child type" of "named entity group processed this time" is "Personnel Department" and "First Personnel Division", is considered. All the combinations described above refer to four combinations of "Business Department" and "Personnel Department", "Business Department" and "First Personnel Division", "Third Business Division" and "Personnel Department", and "Third Business Division" and "First Personnel Division". In a case where the cosine similarity is calculated for all the combinations, the processing advances to S908.

At S908, the following processing is performed for each child type processed this time. The initial output determination unit 222 determines whether or not the maximum value of the calculated cosine similarity is higher than or equal to a second threshold value. In a case where the maximum value of the calculated cosine similarity is higher than or equal to the second threshold value, the processing advances to S909.

In a case where the maximum value of the calculated cosine similarity is less than the second threshold value, the loop processing of the next child type processed this time is performed. In a case where the maximum value of the calculated cosine similarity is less than the second threshold value and the loop processing is completed for all the child types processed this time, the flow of the output permission/prohibition modification processing shown in FIG. 9 is finished. Here, the second threshold value is set to a value independent of the first threshold value in accordance with the situation.

At S909, the output permission/prohibition results of the child type of the individual modification contents whose cosine similarity is the maximum are reflected in the output permission/prohibition results of the processing-target (display-target) child type among the child types processing this time. In a case where the processing at S909 is completed, the loop processing of the next child type processed this time is performed. In a case where the loop processing is completed for all the child types processed this time, the flow of the output permission/prohibition modification processing shown in FIG. 9 is finished.

<Specific Example of Output Permission/Prohibition Determination Processing Results>

FIG. 10A, FIG. 10B, and FIG. 10C are diagrams showing a specific example of the output permission/prohibition determination processing results by the initial output determination unit 222.

In a case where the named entity recognition processing and the named entity grouping processing of the present embodiment are performed for the document image shown in FIG. 10A, it is possible to obtain named entity recognition results shown in Named Entity Type, Group, and Named Entity Text in FIG. 10C.

Here, it is assumed that as one of the individual modification contents of the modification information 233, the contents shown in FIG. 10B are included.

In the initial output determination unit 222 described previously, the following processing is performed.

That is, from text "Estimate Form" of "TITLE" type, the document type is determined to be the estimate form by the document type determination processing described previously. Consequently, this is the same as the document type of the individual modification contents shown in FIG. 10B, and therefore, the output permission/prohibition modification processing is continued.

Further, the similarity between the text of the parent type and each text of the child type of Gr. 1 of "ORGfrom", which are the named entity recognition results of the present embodiment shown in FIG. 10 and the text of the parent type and each text of the child type of the individual modification contents shown in FIG. 10B is high. That is, the threshold value in the text of the parent type is greater than or equal to the first threshold value and each threshold value in each text of the child type is also greater than or equal to the second threshold value. Consequently, in the output permission/prohibition results of each text of Gr. 1 of "ORGfrom" shown in FIG. 10C, the output permission/prohibition information of the individual modification contents shown in FIG. 10B is reflected. By this change, the text "Personnel Department" is changed from "Not output" to "Output".

The display control unit 240 displays the named entity recognition results on the display device 107, such as a touch panel, at S407.

Figures 11A, 11B:
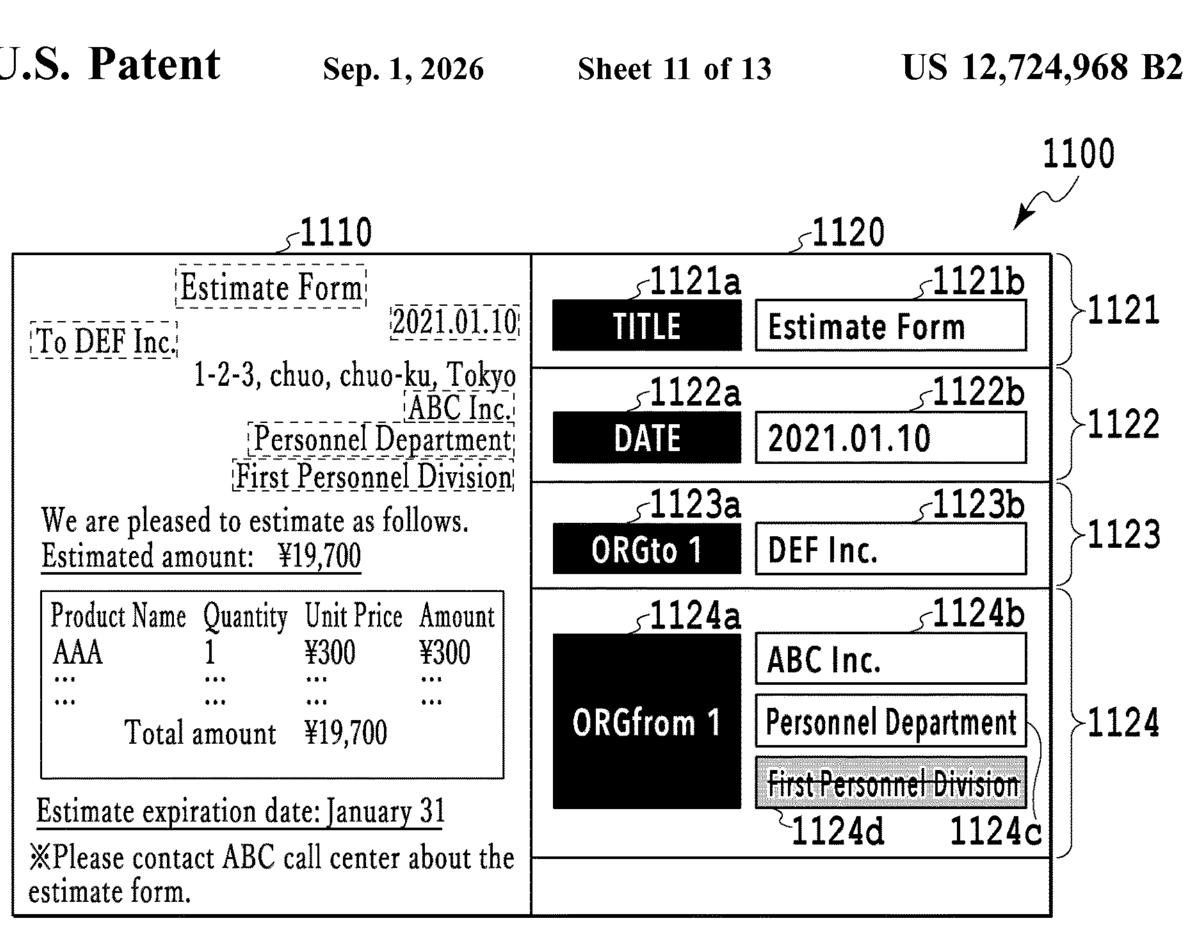
FIG. 11A is a diagram showing a specific example of results of named entity recognition displayed by a display unit.
FIG. 11B is a diagram showing a specific example of results of the named entity recognition displayed by the display unit.

FIG. 11A and FIG. 11B each show a specific example of a user interface screen (UI screen) 1100 on which the display control unit 240 displays the above-described named entity recognition results. The examples in FIG. 11A and FIG. 11B correspond to the examples in FIG. 7A and FIG. 7B, respectively.

The user interface screen 1100 has a preview pane 1110, which is an area in which a document image obtained by utilizing the scanner 105 is preview-displayed, and a property pane 1120, which is an area in which the above-described named entity recognition results are displayed.

Within the property pane 1120, display fields 1121 to 1127 for each extracted named entity type are provided. In the field of the named entity type name of each display field, named entity types 1121*a* to 1127*a* are displayed. In the named entity text field corresponding to each named entity type, named entity texts 1121*b* to 1127*b*, 1124*c*, 1124*d*, 1126*c*, and 1127*c* are displayed.

The named entity type extracted by the inference model 232 of the present embodiment and the named entity type shown in FIG. 11A and FIG. 11B correspond to each other as follows. TITLE corresponds to "Title", DATE corresponds to "Date of issue", ORGto corresponds to "Destination organization", and ORGfrom corresponds to "Issuing organization".

As shown in the display field 1124, the named entities grouped by the grouping unit 221 are displayed in each group into which the named entities are put together. Then, among the named entities within the group, the named entity texts 1124*b*, 1124*c*, 1126*b*, 1126*c*, 1127*b*, and 1127*c* determined to be output by the output permission/prohibition determination by the initial output determination unit 222 are displayed within a white bounding box. On the other hand, the named entity text 1124*d* determined not to be output is displayed within a grayed-out bounding box and further, a cancellation line is drawn thereacross. In this manner, based on the output permission/prohibition results determined by the initial output determination unit 222, the display contents of the named entity text within the group are changed.

The display control unit 240 requests a user to approve or modify the output permission/prohibition results for each extracted named entity at S408. That is, the user approves or modifies the output permission/prohibition information on each named entity. In the present embodiment, by touching the bounding box in which each named entity text is displayed within the property pane 1120 via the display device 107, such as a touch panel, or clicking the bounding box by operating a mouse or the like, it is possible to change the output permission/prohibition information.

Figure 12:
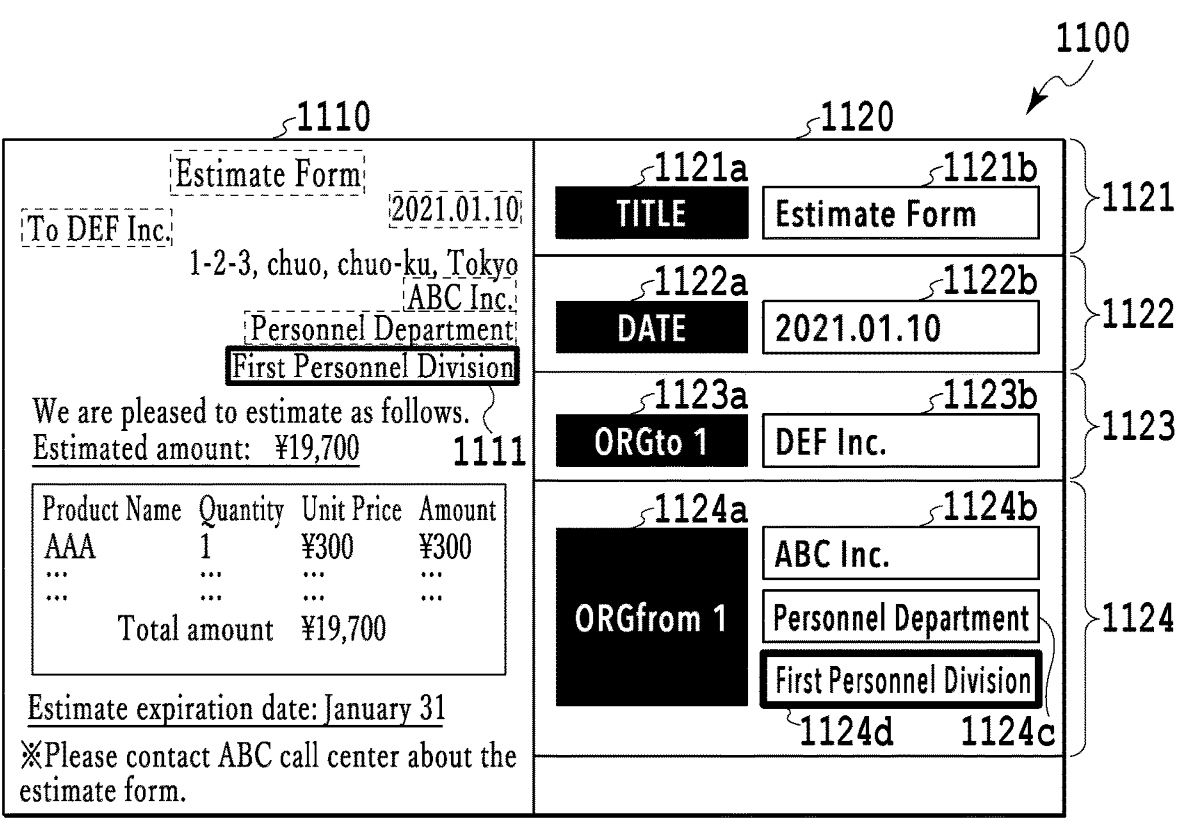
FIG. 12 is a diagram showing a specific example of results of the named entity recognition displayed by the display unit.

For example, in a case where "First Personnel Division" of the named entity text 1124*d* is touched or clicked on the user interface screen 1100 in FIG. 11A, the output permission/prohibition information is changed from "Not output" to "Output". In this case, the user interface screen 1100 changes to that as in FIG. 12. The bounding box of the named entity text 1124*d* changes to white and the cancellation line is not drawn. Further, in order to emphasize the change, the bounding box of the named entity text 1124*d* is displayed by thickening its frame line. Further, in order to make it easy to find the changed portion, a portion 1111 corresponding to the named entity text 1124*d* within the preview pane 1110 is enclosed by a thick frame line and highlighted.

As described above, it is possible to easily display a named entity having a plurality of hierarchical layers on the user interface screen by performing grouping. At the same time, this allows the user to efficiently select or modify which hierarchical layer of the named entity to use.

Further, like ORGfrom in FIG. 11B, in a case where a plurality of named entity groups of the same type is extracted, a user is required to perform the following items. That is, a user is caused to select one typical group to be used as a file name, which is permitted to be output, and prevented from using the other groups as a file name, which are prohibited to be output.

Next, at S409, the named entity output unit 250 outputs the named entity recognition results and the document type determination results to the file storage unit 204. Here, each named entity type and the corresponding text are output in a dictionary format, in which each named entity type is taken as a key and the corresponding text is taken as a value, respectively. At this time, in a case where there is a plurality of named entities whose output is determined to be possible within the same group, the plurality of the texts of the named entities whose output is possible is coupled and output as one named entity. That is, in the case shown in FIG. 12, ORGfrom is output as "ABC Inc. Personnel Department First Personnel Division". Duet to this, it is possible to handle the organization names related in the hierarchical structure and it is made easy to handle information in a case of assigning a file name in the subsequent stage, and so on.

Next, the file storage unit 204 assigns a file name to the document image data obtained by the image obtaining unit 201 based on the output results of the named entity output unit 250 and stores the document image data under a predetermined folder. The document image data is converted into the pdf format and stored within the storage device 106 or in a storage device within an external server via the network 109.

Figure 13:
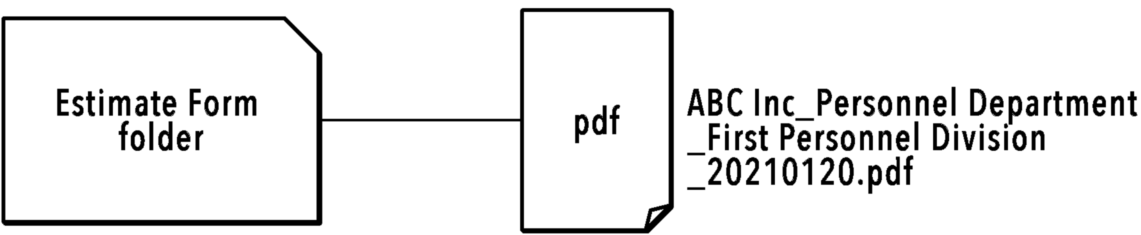
FIG. 13 is a schematic diagram showing a specific example of a hierarchical structure of a file to be stored.

An example of the hierarchical structure of a file that is stored is shown in FIG. 13. The folder name of a storage destination and the file name of a document image are determined in accordance with a rule set in advance by instructions of a user. In the example shown in FIG. 13, the folder name and the file name are determined as follows.

First, the folder name of a storage destination is determined based on the above-described document type determination results. In a case where the document type determination results are "Estimate Form", the document image file is stored under the "Estimate Form" folder. The file name of a document image is created by connecting ORGfrom and DATE by an underscore. As described above, ORGfrom is output as one named entity by coupling the texts whose output permission/prohibition information indicates that output is possible. For DATE, in order to absorb a difference in assigning a file name depending on the display format, dots between year, month, and day are removed.

Like ORGfrom in FIG. 11B, in a case where a plurality of named entity groups of the same type is extracted, the description is such that only one group is possible to be output as a typical group, but the method is not limited to this. For example, it may also be possible to make all the group names possible to be output and use a file name for assignment, which is obtained by connecting the named entity text of each group with a specific character string (for example, underscore).

Further, the displays in FIG. 11A and FIG. 1B are merely exemplary and the display method is not limited to this. For example, in a case of the named entity type 1124*a*, it may also be possible to display from the bottom, that is, in the order of the named entity texts 1124*b*, 1124*c*, and 1124*d*.

Lastly, in a case where the display control unit 240 receives a request to modify output permission/prohibition information from a user, the storage unit 223 of the initial output setting unit 220 stores in the storage unit 230 as the modification information 233 based on the contents of the modification request. As described above, in the modification information, information on the named entity type of the modified named entity group and the text of each named entity, the output permission/prohibition change contents before and after modification, the type of the document in which the modified named entity is included, or the like is included.

Thereby, in a case where the user once select or modify which hierarchical layer of the named entity to use on the user interface screen, it is possible to automatically select the named entity of the same hierarchical layer in a case where the same document is processed later.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-198643, filed Dec. 13, 2022, which is hereby incorporated by reference wherein in its entirety.

What is claimed is:

1. An information processing apparatus comprising:

a storage unit configured to store a plurality of named entities in association with information indicating whether to display the plurality of named entities;

one or more processors coupled to a memory that function as:

an extraction unit configured to extract a plurality of named entities by inputting document data to a named entity recognition model;

a determination unit configured to determine whether each of the extracted plurality of named entities represents a generic concept or a specific concept; and a display control unit configured to display the extracted plurality of named entities in a relationship between the generic concept and the specific concept on a UI screen of a display device, wherein the display control unit:

displays one of the extracted plurality of named entities representing the generic concept based on information on one of the stored plurality of named entities representing the generic concept, in a case where the one of the extracted plurality of named entities is similar to the one of the stored plurality of named entities; and displays one of the extracted plurality of named entities representing the specific concept based on information on one of the stored plurality of named entities representing the specific concept, in a case where the one of the stored plurality of named entities is a named entity which is most similar to the one of the extracted plurality of named entities, wherein the information indicating whether to display the plurality of named entities is initially set so that a named entity representing the generic concept is output and a named entity representing the specific concept is not output, the information being modifiable based on user instructions, and wherein the similarity is calculated by using cosine similarity between an average of characteristic amount vectors of each token of the one of the extracted plurality of named entities and an average of characteristic amount vectors of each token of the one of the stored plurality of named entities.

2. The information processing apparatus according to claim 1, wherein the display control unit displays the plurality of the named entities by dividing into the determined generic concept or the determined specific concept.

3. The information processing apparatus according to claim 2, wherein, in a case where there are a generic concept level and a specific concept level in the plurality of the named entities determined to be the specific concept, the display control unit displays the named entity at the generic concept level at a position closer to the named entity determined to be the generic concept.

4. The information processing apparatus according to claim 3, wherein the extracted plurality of the named entities is stored in association with the information based on user instructions.

5. The information processing apparatus according to claim 1, wherein the display control unit:

calculates a similarity between each of the stored plurality of named entities representing the specific concept and each of the extracted plurality of named entities representing the specific concept.

6. The information processing apparatus according to claim 1, wherein the document data is generated by performing character recognition processing for a document.

7. A method of controlling an information processing apparatus, comprising:

storing a plurality of named entities in association with information indicating whether to display the plurality of named entities;

extracting a plurality of named entities by inputting document data to a named entity recognition model;

determining whether each of the extracted plurality of named entities represents a generic concept or a specific concept; and displaying the extracted plurality of named entities in a relationship between the generic concept and the specific concept on a UI screen of a display device in one group, wherein in the displaying:

one of the extracted plurality of named entities representing the generic concept based on information on one of the stored plurality of named entities representing the generic concept is displayed on the UI screen, in a case where the one of the extracted plurality of named entities is most similar to the one of the stored plurality of named entities; and one of the extracted plurality of named entities representing the specific concept based on information on one of the stored plurality of named entities representing the specific concept is displayed on the UI screen, in a case where the one of the stored plurality of named entities is a named entity which is most similar to the one of the extracted plurality of named entities, wherein the information indicating whether to display the plurality of named entities is initially set so that a named entity representing the generic concept is output and a named entity representing the specific concept is not output, the information being modifiable based on user instructions, and wherein the similarity is calculated by using cosine similarity between an average of characteristic amount vectors of each token of the one of the extracted plurality of named entities and an average of characteristic amount vectors of each token of the one of the stored plurality of named entities.

8. A non-transitory computer readable storage medium storing a program executable by a computer to perform a method of controlling an information processing apparatus, the method comprising:

storing a plurality of named entities in association with information indicating whether to display the plurality of named entities;

extracting a plurality of named entities by inputting document data to a named entity recognition model;

determining whether each of the extracted plurality of named entities represents a generic concept or a specific concept; and displaying the extracted plurality of named entities in a relationship between the generic concept and the specific concept on a UI screen of a display device in one group, wherein in the displaying:

one of the extracted plurality of named entities representing the generic concept based on information on one of the stored plurality of named entities representing the generic concept is displayed on the UI screen, in a case where the one of the extracted plurality of named entities is most similar to the one of the stored plurality of named entities; and one of the extracted plurality of named entities representing the specific concept based on information on one of the stored plurality of named entities representing the specific concept is displayed on the UI screen, in a case where the one of the stored plurality of named entities is a named entity which is most similar to the one of the extracted plurality of named entities, wherein the information indicating whether to display the plurality of named entities is initially set so that a named entity representing the generic concept is output and a named entity representing the specific concept is not output, the information being modifiable based on user instructions, and wherein the similarity is calculated by using cosine similarity between an average of characteristic amount vectors of each token of the one of the extracted plurality of named entities and an average of characteristic amount vectors of each token of the one of the stored plurality of named entities.

* * * * *